United States Patent
Piesker (10) Patent No.: US 9,603,380 B2
(45) Date of Patent: Mar. 28, 2017

(54) MULTIFUNCTIONAL REFRIGERANT CONTAINER AND METHOD OF OPERATING SUCH A REFRIGERANT CONTAINER

(71) Applicant: Airbus Operations GmbH, Hamburg (DE)

(72) Inventor: Markus Piesker, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 359 days.

(21) Appl. No.: 14/032,890

(22) Filed: Sep. 20, 2013

(65) Prior Publication Data

US 2014/0090407 A1    Apr. 3, 2014

Related U.S. Application Data

(63) Continuation of application No. PCT/EP2012/001287, filed on Mar. 23, 2012.
(Continued)

(30) Foreign Application Priority Data

Mar. 24, 2011 (DE) .................. 10 2011 014 943

(51) Int. Cl.
   *A23L 3/36*    (2006.01)
   *F25B 43/00*   (2006.01)

(52) U.S. Cl.
   CPC .............. *A23L 3/36* (2013.01); *F25B 43/006* (2013.01); *F25B 2400/053* (2013.01)

(58) Field of Classification Search
   CPC .............. F25B 43/006; F25B 2400/053; F25B 2600/0261; F25B 40/02; F25B 2400/16; F25B 2600/2523
   (Continued)

(56) References Cited

U.S. PATENT DOCUMENTS

3,088,292 A * 5/1963 Kocher .................. F24F 5/001
                                                62/196.1
3,545,228 A * 12/1970 Dinger et al. .................. 62/506
(Continued)

FOREIGN PATENT DOCUMENTS

CN     101124441    2/2008
DE     102006005035  9/2007
(Continued)

OTHER PUBLICATIONS

Chinese Office Action, Jan. 23, 2015.

*Primary Examiner* — Allana Lewin Bidder
*Assistant Examiner* — Zachary R Anderegg
(74) *Attorney, Agent, or Firm* — Greer Burns & Crain, Ltd.

(57) ABSTRACT

A refrigerant container, which is in particular suitable for use in a cooling system designed for operation with a two-phase refrigerant, includes a receiving space for receiving a refrigerant that is disposed in an interior of the refrigerant container. Disposed in the receiving space of the refrigerant container is a heat exchanger allowing passage of a further refrigerant therethrough and being configured to remove heat from refrigerant in the liquid and/or gaseous state of aggregation that is received in the receiving space in order to supercool the refrigerant and/or convert the refrigerant to the liquid state of aggregation.

16 Claims, 6 Drawing Sheets

Related U.S. Application Data (60) Provisional application No. 61/466,973, filed on Mar. 24, 2011.

(58) Field of Classification Search
USPC .................................................. 62/406, 216
See application file for complete search history.

(56) References Cited

U.S. PATENT DOCUMENTS

| | | | |
|---|---|---|---|
| 4,748,831 A | | 6/1988 | Shaw |
| 5,651,263 A | * | 7/1997 | Nonaka .................. F25B 9/006 62/205 |
| 2008/0202156 A1 | * | 8/2008 | Baek .............................. 62/503 |
| 2009/0000329 A1 | | 1/2009 | Colberg et al. |
| 2010/0251737 A1 | | 10/2010 | Roering |

FOREIGN PATENT DOCUMENTS

| | | |
|---|---|---|
| DE | 102009011797 | 9/2010 |
| EP | 1818633 | 8/2007 |
| JP | 10111047 | 4/1998 |
| JP | 11248267 | 9/1999 |

\* cited by examiner

MULTIFUNCTIONAL REFRIGERANT CONTAINER AND METHOD OF OPERATING SUCH A REFRIGERANT CONTAINER

CROSS-REFERENCES TO RELATED APPLICATIONS

This application is a continuation of International Application PCT/EP2012/001287 filed Mar. 23, 2012, designating the United States and published on Sep. 27, 2012 as WO 2012/126635. This application also claims the benefit of the U.S. Provisional Application No. 61/466,973, filed on Mar. 24, 2011, and of the German patent application No. 10 2011 014 943.0 filed on Mar. 24, 2011, the entire disclosures of which are incorporated herein by way of reference.

BACKGROUND OF THE INVENTION

The invention relates to a multifunctional refrigerant container that is suitable in particular for use in a cooling system designed for operation with a two-phase refrigerant to cool food on board an aircraft. The invention further relates to a method of operating such a refrigerant container.

A cooling system that is suitable for operation with a two-phase refrigerant is known from DE 10 2006 005 035 B3 and is used for example to cool food that is stored on board a passenger aircraft and intended for issuing to the passengers. Typically the food provided for supplying to the passengers is kept in mobile transport containers. These transport containers are filled and precooled outside of the aircraft and after loading into the aircraft are deposited at suitable locations in the aircraft passenger cabin, for example in the galleys. In order to guarantee that the food remains fresh up to the time of being issued to the passengers, in the region of the transport container locations cooling stations are provided, which are supplied with cooling energy from a central frigorific device and deliver this cooling energy to the transport containers, in which the food is stored. In this case, compared to frigorific units formed separately at the individual transport container locations a cooling system with a central frigorific device offers the advantage of a smaller installation volume and reduced weight and moreover entails less outlay for assembly and maintenance. What is more, given the use of a cooling system with a central frigorific device disposed outside of the passenger cabin it is possible to avoid machinery noise that is generated by frigorific units positioned in the region of the transport container locations and is audible in the aircraft passenger cabin and hence may be found intrusive.

In the cooling system known from DE 10 2006 005 035 B3 the phase transitions of the refrigerant flowing through the cooling circuit that occur during operation of the system enable the latent heat consumption that then arises to be utilized for cooling purposes. The refrigerant mass flow needed to deliver a desired cooling capacity is therefore markedly lower than for example in a liquid cooling system, in which a one-phase liquid refrigerant is used. Consequently, the cooling system described in DE 10 2006 005 035 B3 may have smaller line cross-sections than a liquid cooling system with a comparable cooling capacity. The reduction of the refrigerant mass flow moreover makes it possible to decrease the delivery rate needed to feed the refrigerant through the cooling circuit of the cooling system. This leads to an increased efficiency of the system because less energy is needed to operate a corresponding feed device, such as for example a pump, and moreover less additional heat, which is generated by the feed device during operation of the feed device, has to be removed from the cooling system.

A problem associated with the cooling system disclosed in DE 10 2006 005 035 B3 is however the high rest pressure of the refrigerant that may arise in the idle state of the system if in the idle state of the system the refrigerant is in the gaseous state of aggregation. Whereas the rest pressure of the refrigerant in a liquid cooling system that uses for example Galden® as a refrigerant is usually at most ca. 20 bar, in a cooling system designed for two-phase operation that uses for example $CO_2$ as a refrigerant pressures of 170 to 220 bar may arise at a system temperature of ca. 85° C. The line system of the cooling system is consequently subject to considerable mechanical stress and has to be designed accordingly.

DE 10 2009 011 797 A1 therefore proposes equipping a cooling system described in DE 10 2006 005 035 B3 with a control valve, which is disposed in the cooling circuit of the cooling system and which, upon transfer of cooling system to its idle state, is controlled in such a way that a desired operating pressure arises in the cooling circuit downstream of the control valve. Refrigerant cooled by the frigorific device is received in a reservoir disposed upstream of the control valve in the cooling circuit.

By means of the operating method described in DE 10 2009 011 797 A1 it is possible effectively to prevent a region of the cooling circuit situated upstream of the control valve, i.e. the lines and other components, such as for example valves, heat exchangers etc., that are provided in this region of the cooling circuit, from being acted upon in the idle state of the cooling system by the high maximum rest pressure of the two-phase refrigerant that arises if the refrigerant is in the gaseous state of aggregation. Instead, the region of the cooling circuit situated downstream of the control valve may be held under a comparatively low operating pressure.

With the cooling systems of prior art there is the problem that it is often difficult to accommodate the system components in the only very limited amount of installation space available on board an aircraft or even to position these in such a way relative to one another that for example by utilizing the force of gravity during process control an optimally efficient operation of the cooling system is made possible.

SUMMARY OF THE INVENTION

The underlying object of the invention is to provide a refrigerant container that is suitable for use in a cooling system designed for operation with a two-phase refrigerant and that enables a flexible and hence volume- and weight-optimized design of the cooling system. A further underlying object of the invention is to indicate a method of operating such a refrigerant container.

A refrigerant container according to the invention, which is suitable in particular for use in a cooling system designed for operation with a two-phase refrigerant, for example a cooling system for cooling food on board an aircraft, comprises a receiving space for receiving a refrigerant that is disposed in an interior of the refrigerant container. During operation of a cooling system equipped with the refrigerant container and in particular in the idle state of the cooling system the refrigerant container may be used to receive refrigerant that during operation of the cooling system circulates in a cooling circuit of the cooling system. The refrigerant may be supplied to the refrigerant container in the liquid or in the gaseous state of aggregation or as wet steam.

The refrigerant to be received in the receiving space of the refrigerant container is preferably a refrigerant that, upon delivery of its cooling energy to a device that is to be cooled, may be converted from the liquid to the gaseous state of aggregation and may then by suitable pressure- and temperature control be reconverted to the liquid state of aggregation. For example, the receiving space of the refrigerant container may be devised to receive as a refrigerant $CO_2$ or R134A ($CH_2F$—$CF_3$). The receiving space of the refrigerant container is preferably designed in such a way as to be capable of reliably receiving a total quantity of refrigerant to be received in the receiving space even when the refrigerant is entirely in the gaseous state of aggregation. The receiving space and/or an enclosure surrounding the receiving space then has to be designed in such a way that it is capable of withstanding the pressure of the refrigerant in the gaseous state of aggregation without incurring damage. The receiving space is preferably large enough to receive the total quantity of refrigerant that during operation of a cooling system equipped with the refrigerant container circulates in the cooling circuit of the cooling system. The refrigerant container is therefore usable as a high-pressure collector for the refrigerant that during operation of a cooling system equipped with the refrigerant container circulates in the cooling circuit of the cooling system.

Disposed in the receiving space of the refrigerant container is a heat exchanger, through which a further refrigerant may flow and which is configured to remove heat from the refrigerant in the liquid and/or gaseous state of aggregation that is received in the receiving space in order to supercool the refrigerant and/or convert the refrigerant to the liquid state of aggregation. Thus the refrigerant container, in addition to its function as a high-pressure collector, may perform the function of a condenser. It is therefore optionally possible to dispense with the use of a separate condenser. If the refrigerant received in the receiving space of the refrigerant container has a lower temperature than the further refrigerant flowing through the heat exchanger, the refrigerant container may also operate as a cold reservoir and cooling energy may be transferred from refrigerant received in the receiving space of the refrigerant container to the further refrigerant flowing through the heat exchanger. The fact that the refrigerant container is usable as a high-pressure collector, condenser or cold reservoir makes it possible to realize various functionalities in a minimum of installation space. The refrigerant container moreover enables particularly flexible operation of a cooling system equipped with the refrigerant container.

The further refrigerant supplied to the heat exchanger may be a different refrigerant from the refrigerant provided for receiving in the receiving space of the refrigerant container and, prior to its being fed into the heat exchanger, may be cooled to a desired low temperature by a frigorific device formed separately from the refrigerant container. For example a liquid refrigerant, but also a two-phase refrigerant, in particular $CO_2$ or R134A, may be used as a further refrigerant. If desired, at least in specific operating phases of a cooling system equipped with the refrigerant container the refrigerant provided for receiving in the receiving space of the refrigerant container may also be supplied as a further refrigerant to the heat exchanger.

The receiving space of the refrigerant container is preferably connected to a first receiving-space line for feeding the refrigerant into the receiving space or to a second receiving-space line for removing the refrigerant from the receiving space. The first receiving-space line is preferably devised to convey refrigerant in the form of wet steam into the receiving space of the refrigerant container. During operation of the heat exchanger integrated into the receiving space of the refrigerant container preferably liquid refrigerant is removed from the receiving space of the refrigerant container through the second receiving-space line.

The first receiving-space line is connected preferably in an upper region of the refrigerant container to the receiving space of the refrigerant container. In contrast thereto, the second receiving-space line is connected preferably to a sump of the receiving space. If desired, the feed of refrigerant into the receiving space of the refrigerant container may be effected at least in specific operating phases of a cooling system equipped with the refrigerant container but also via the second receiving-space line connected to a sump of the receiving space, and the removal of refrigerant from the receiving space of the refrigerant container may be effected via the first receiving-space line connected in an upper region of the refrigerant container to the receiving space of the refrigerant container.

It is further conceivable at least in specific operating phases of a cooling system equipped with the refrigerant container to use both the first receiving-space line and the second receiving-space line to remove refrigerant from the receiving space of the refrigerant container. For example, the first receiving-space line connected in an upper region of the refrigerant container to the receiving space of the refrigerant container may be used to remove gaseous refrigerant from the receiving space of the refrigerant container. In contrast thereto, the second receiving-space line connected to a sump of the receiving space may be used to remove refrigerant, which has condensed as a result of heat transfer to the heat exchanger, from the receiving space of the refrigerant container. The refrigerant container may therefore be used also as a separator for the separation of gaseous and liquid refrigerant.

In the first receiving-space line a control valve for controlling the flow of the refrigerant through the first receiving-space line is preferably disposed. Alternatively or in addition thereto, in the second receiving-space line a control valve for controlling the flow of the refrigerant through the second receiving-space line may be disposed. As the refrigerant may be fed into the receiving space or removed from the receiving space both in the gaseous and in the liquid state of aggregation, the valves disposed in the first receiving-space line and/or the second receiving-space line are also suitable for controlling the pressure of the refrigerant flowing through the first receiving-space line and/or the second receiving-space line. Alternatively thereto, additional pressure reducers may be disposed in the first receiving-space line and/or the second receiving-space line.

By means of the control valves disposed in the first receiving-space line and/or the second receiving-space line the refrigerant container may be separated from components of the cooling system that are disposed upstream or downstream of the refrigerant container. In this way it may be effectively prevented that in the idle state of a cooling system equipped with the refrigerant container, if the refrigerant circulating during operation of the cooling system in the circuit of the cooling system is received in the gaseous state of aggregation in the receiving space of the refrigerant container, components of the cooling system that are situated downstream and/or upstream of the refrigerant container are acted upon by the high maximum rest pressure of the refrigerant. Instead, regions of the cooling circuit that are situated outside of the refrigerant container may be held under a comparatively low operating pressure.

The mechanical stress, to which the line system and other components of the cooling system are subject, may therefore be markedly reduced. A design of these components that is adapted to the reduced mechanical stress therefore enables weight- and volume reductions that have a positive effect, particularly given use of the cooling system on board an aircraft, and lead to a lowering of the manufacturing- and operating costs. Furthermore, a cooling system, because of the reduced pressure prevailing in extensive regions of the cooling circuit in the idle state of the cooling system, is characterized by greater operational reliability and a reduced susceptibility to leaks. Finally, assembly- and maintenance work is simplified.

The heat exchanger may be connected to a first heat-exchanger line for feeding the further refrigerant into the heat exchanger and to a second heat-exchanger line for removing the further refrigerant from the heat exchanger. The first heat-exchanger line may be connected for example to a frigorific device formed separately from the refrigerant container. The first heat-exchanger line may further be connectable to the removal line for removing refrigerant from the receiving space of the refrigerant container, so that refrigerant from the receiving space of the refrigerant container may flow through the heat exchanger. The second heat-exchanger line may comprise a first line branch, which emanates from the receiving space of the refrigerant container, and a second line branch, which opens into the receiving space of the refrigerant container. Through the first line branch of the second heat-exchanger line the further refrigerant may be conveyed out of the heat exchanger and the receiving space of the refrigerant container and, for example after suitable cooling by means of a frigorific device, conveyed in the circuit back into the heat exchanger. Through the second line branch of the second heat-exchanger line the further refrigerant, after flowing through the heat exchanger, may on the other hand be conveyed into the receiving space of the refrigerant container.

In the second heat-exchanger line a control valve for controlling the flow of the further refrigerant through the first and/or the second line branch is preferably disposed. A control valve disposed in the second heat-exchanger line or control valves disposed in the line branches of the heat-exchanger line make it possible to adjust in the heat exchanger a pressure of the further refrigerant that is higher than a pressure of the refrigerant in the receiving space of the refrigerant container. In this way an existing temperature difference between an interior of the heat exchanger and the receiving space of the refrigerant container may be maintained.

A control valve disposed in the second heat-exchanger line may be disposed outside of the receiving space in the interior of the refrigerant container. For example a region of the interior of the refrigerant container, through which refrigerant does not flow, may be used as an installation space for a control valve disposed in the first and/or the second line branch of the second heat-exchanger line. An arrangement of valves or other components outside of a region of the refrigerant container, through which refrigerant flows, is meaningful particularly if the valves or other components comprise electrical or electronic components.

The heat exchanger may in principle take the form of a continuous component. Alternatively, the heat exchanger may however comprise a first portion and a second portion, wherein the first portion of the heat exchanger may be configured to remove heat from refrigerant in the liquid state of aggregation that is received in a sump of the receiving space, and wherein the second portion of the heat exchanger may be configured to remove heat from refrigerant in a gaseous state of aggregation that is received in a region of the receiving space situated above the sump. A heat exchanger having two portions enables a differentiated heat transfer of refrigerant received in different regions of the receiving space of the refrigerant container. It is self-evident that a refrigerant container, which comprises a heat exchanger having two portions, may also be operated as a cold reservoir and transfer cooling energy from refrigerant received in the receiving space of the refrigerant container to the further refrigerant flowing through the heat exchanger.

The first heat-exchanger line for feeding the further refrigerant into the heat exchanger may comprise a first line branch, which is connected to the first portion of the heat exchanger, and a second line branch, which is connected to the second portion of the heat exchanger. In the first heat-exchanger line preferably at least one control valve for controlling the supply of the further refrigerant into the first and/or second portion of the heat exchanger is disposed. In this way the first and the second portion of the heat exchanger may be supplied in a differentiated manner with further refrigerant.

In a method according to the invention of operating a refrigerant container, which is suitable in particular for use in a cooling system designed for operation with a two-phase refrigerant and comprises a receiving space for receiving a refrigerant that is disposed in an interior of the refrigerant container, a further refrigerant flows through a heat exchanger, which is disposed in the receiving space of the refrigerant container and removes heat from refrigerant in the gaseous state of aggregation that is received in the receiving space in order to convert the refrigerant to the liquid state of aggregation.

The receiving space of the refrigerant container may be connected to a first receiving-space line for feeding the refrigerant into the receiving space and to a second receiving-space line for removing the refrigerant from the receiving space, wherein a control valve disposed in the first receiving-space line and/or the second receiving-space line may control the flow of the refrigerant through the first receiving-space line and/or the second receiving-space line.

The heat exchanger may be connected to a first heat-exchanger line for feeding the further refrigerant into the heat exchanger and to a second heat-exchanger line for removing the further refrigerant from the heat exchanger, wherein the second heat-exchanger line may comprise a first line branch, which emanates from the receiving space of the refrigerant container, and a second line branch, which opens into the receiving space of the refrigerant container.

A control valve disposed in the second heat-exchanger line may control the flow of the further refrigerant through the first and/or the second line branch.

A control valve disposed in the second heat-exchanger line may be disposed outside of the receiving space in the interior of the refrigerant container.

The heat exchanger may comprise a first portion and a second portion, wherein the first portion of the heat exchanger may remove heat from refrigerant in the liquid state of aggregation that is received in a sump of the receiving space, and wherein the second portion of the heat exchanger may remove heat from refrigerant in a gaseous state of aggregation that is received in a region of the receiving space situated above the sump.

The first heat-exchanger line for feeding the further refrigerant into the heat exchanger may comprise a first line branch, which is connected to the first portion of the heat exchanger, and a second line branch, which is connected to a second portion of the heat exchanger. At least one control valve disposed in the first heat-exchanger line may control the feed of the further refrigerant into the first and/or the second portion of the heat exchanger.

The refrigerant container according to the invention is particularly well suited for use in an aircraft cooling system for cooling food on board the aircraft.

BRIEF DESCRIPTION OF THE DRAWINGS

There now follows a detailed description of preferred embodiments of the invention with reference to the accompanying diagrammatic drawings, which show in FIG. 1 a refrigerant container that is suitable for use in an aircraft cooling system, FIG. 2 a further refrigerant container that is suitable for use in an aircraft cooling system, FIG. 3 a further refrigerant container that is suitable for use in an aircraft cooling system, FIG. 4 a further refrigerant that is suitable for use in an aircraft cooling system, and FIG. 5 a further refrigerant container that is suitable for use in an aircraft cooling system.

DETAILED DESCRIPTION OF THE PREFERRED EMBODIMENTS

Figure 1:
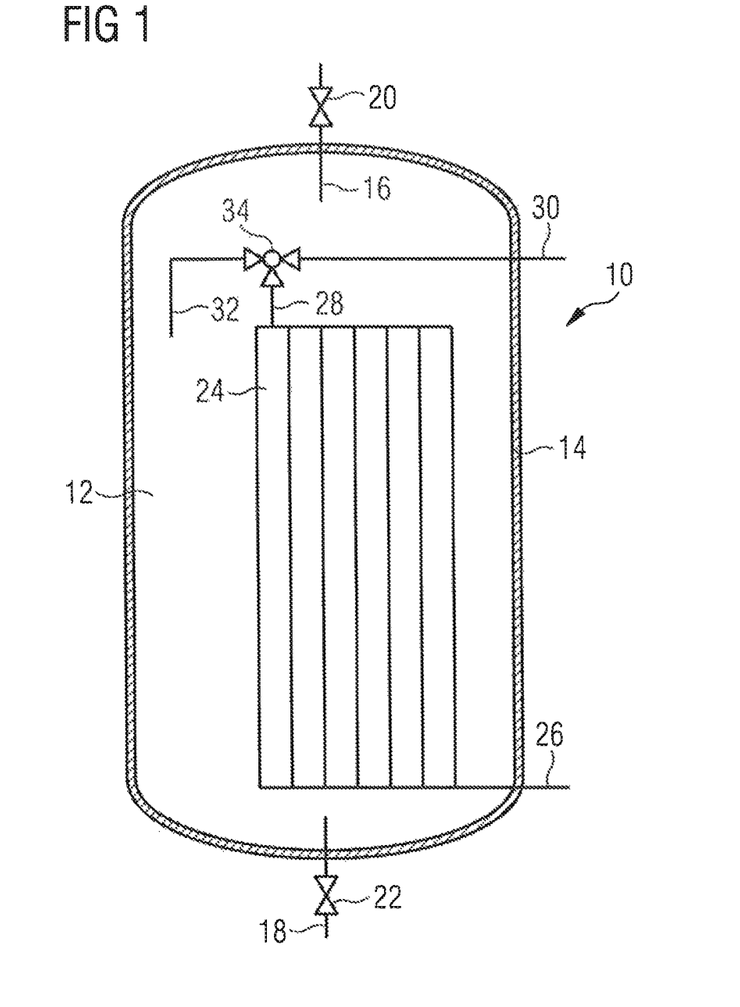
Figure 6:
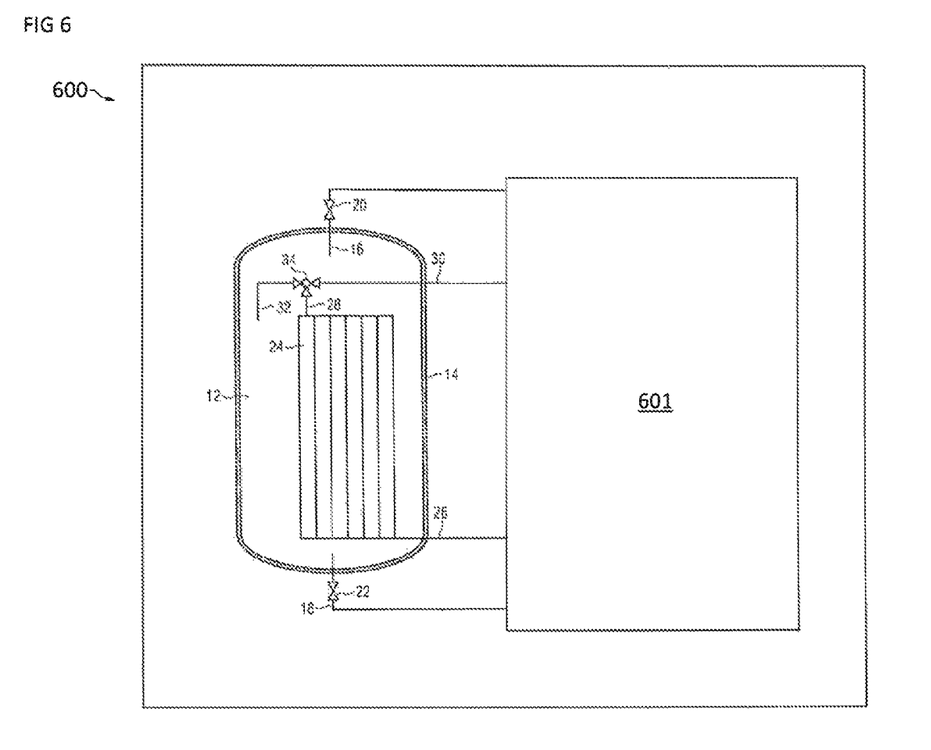
FIG. 6 is a further refrigerant container that is suitable for use in an aircraft cooling system.

FIGS. 1 and 6 show a first refrigerant container 10, which is particularly suitable for use in a cooling system 601 designed for operation with a two-phase refrigerant, for example, a cooling system for cooling food on board an aircraft 600. The refrigerant container 10 comprises a receiving space 12 disposed in an interior of the refrigerant container 10 for receiving a two-phase refrigerant that during operation of a cooling system equipped with the refrigerant container 10 circulates in a cooling circuit of the cooling system. For example the receiving space 12 of the refrigerant container 10 may be provided for receiving $CO_2$ or R134A.

The receiving space 12 of the refrigerant container 10 is designed in such a way as to be capable of receiving the total quantity of refrigerant, which during operation of a cooling system equipped with the refrigerant container 10 circulates in the cooling circuit of a cooling system, even when the refrigerant, for example in the idle state of the cooling system, is in the gaseous state of aggregation. The receiving space 12 and/or an enclosure 14 surrounding the receiving space that in the first embodiment of the refrigerant container 10 shown in FIG. 1 is formed by an outer casing of the refrigerant container 10 is consequently designed in such a way that it is capable of withstanding the pressure of the refrigerant in the gaseous state of aggregation without incurring damage. The refrigerant container 10 is therefore usable as a high-pressure collector for the refrigerant, which during operation of a cooling system equipped with the refrigerant container 10 circulates in the cooling circuit of the cooling system.

In an upper region the receiving space 12 of the refrigerant container 10 is connected to a first receiving-space line 16. A sump of the receiving space 12, on the other hand, is connected to a second receiving-space line 18. Through the receiving-space lines 16, 18 refrigerant may be supplied to the receiving space 12 of the refrigerant container 10 or refrigerant may be removed from the receiving space 12 of the refrigerant container 10. Disposed in the first receiving-space line 16 is a control valve 20 for controlling the flow of the refrigerant through the first receiving-space line 16. In the second receiving-space line 18 there is further disposed a control valve 22 for controlling the flow of the refrigerant through the second receiving-space line 18.

The valves 20, 22 disposed in the receiving-space lines 16, 18 are also suitable for controlling the pressure of the refrigerant flowing through the receiving-space lines 16, 18. In particular, however, the valves 20, 22 are used to separate the refrigerant container 10 and/or the receiving space 12 of the refrigerant container 10 from components of a cooling system equipped with the refrigerant container 10 that are disposed upstream or downstream of the refrigerant container 10. In this way it may be effectively prevented that in operating phases of the cooling system, during which the refrigerant circulating during normal operation of the cooling system in the cooling circuit of the cooling system is received in the gaseous state of aggregation in the receiving space 12 of the refrigerant container 10, components of the cooling system that are situated downstream and/or upstream of the refrigerant container 10 are acted upon by high pressure. Instead, regions of the cooling circuit that are situated outside of the refrigerant container 10 may be held under a comparatively low operating pressure.

Disposed in the receiving space 12 of the refrigerant container 10 is a heat exchanger 24, through which a further refrigerant may flow.

The further refrigerant supplied to the heat exchanger 24 may be a different refrigerant from the refrigerant provided for receiving in the receiving space 12 of the refrigerant container 10 and may for example, prior to its being fed into the heat exchanger 24, be cooled to a desired low temperature by a frigorific device formed separately from the refrigerant container 10. For example a liquid refrigerant, but also a two-phase refrigerant, in particular $CO_2$ or R134A, may be used as a further refrigerant. If desired, at least in specific operating phases of a cooling system equipped with the refrigerant container 10 the refrigerant provided for receiving in the receiving space 12 of the refrigerant container 10 may also be supplied as further refrigerant to the heat exchanger 24.

The heat exchanger is connected to a first heat-exchanger line 26 for feeding the further refrigerant into the heat exchanger 24 and to a second heat-exchanger line 28 for removing the further refrigerant from the heat exchanger 24. The first heat-exchanger line 26 may be connected for example to a frigorific device formed separately from the refrigerant container 10. The first heat-exchanger line 26 may further be connected to the second receiving-space line 18 so that, if need be, refrigerant from the receiving space 12 of the refrigerant container 10 may be fed into the heat exchanger 24.

The second heat-exchanger line 28 comprises a first line branch 30, which emanates from the receiving space 12 of the refrigerant container 10, and a second line branch 32, which opens into the receiving space 12 of the refrigerant container 10. Through the first line branch 30 of the second heat-exchanger line 28 the further refrigerant may be conveyed out of the heat exchanger 24 and the receiving space 12 of the refrigerant container 10 and, for example after suitable cooling by means of a frigorific device, conveyed in the circuit back into the heat exchanger 24. Through the second line branch 32 of the second heat-exchanger line the further refrigerant, after flowing through the heat exchanger

24, may on the other hand be conveyed into the receiving space 12 of the refrigerant container 10.

Disposed in the second heat-exchanger line 28 at a point of connection between the first and the second line branch 30, 32 is a control valve 34 for controlling the flow of the further refrigerant through the first and the second line branch 30, 32. The control valve 34 makes it possible to adjust in the heat exchanger 24 a pressure of the further refrigerant that is higher than a pressure of the refrigerant in the receiving space 12 of the refrigerant container 10. In this way an existing temperature difference between an interior of the heat exchanger 24 and the receiving space 12 of the refrigerant container 10 may be maintained.

There now follows a discussion of the method of functioning and the operation of the refrigerant container 10. As already mentioned, the receiving space 12 of the refrigerant container 10 is designed in such a way as to be capable of receiving the total quantity of refrigerant, which during operation of a cooling system equipped with the refrigerant container 10 circulates in the cooling circuit of the cooling system, when the cooling system is in its idle state. During shutdown of the cooling system, therefore, the refrigerant circulating in the cooling circuit of the cooling system may be fed into the receiving space 12 of the refrigerant container 10. The refrigerant may be supplied to the refrigerant container 10 in the liquid or in the gaseous state or as wet steam.

In each case, the refrigerant evaporates in the receiving space 12 of the refrigerant container 10 if the ambient temperature exceeds the evaporation temperature of the refrigerant and the refrigerant container 10 is not cooled. The control valves 20, 22 however prevent the pressure of the gaseous refrigerant in the receiving space 12 of the refrigerant container 10 from being transferred to components of the cooling system that are situated downstream and/or upstream of the refrigerant container 10. In the idle state of the cooling system the refrigerant container 10 therefore serves as a high-pressure collector.

If, for example during start-up of the cooling system, some of the gaseous refrigerant is to be discharged from the receiving space 12 of the refrigerant container 10 into the cooling circuit of the cooling system, the removal of the refrigerant from the receiving space 12 of the refrigerant container 10 may be effected through the first or the second receiving-space line 16, 18. The pressure in this case is controlled by means of the valves 20, 22 disposed in the receiving-space lines 16, 18 or by means of separate pressure reducers.

Furthermore, during start-up of the cooling system the gaseous refrigerant received in the receiving space 12 of the refrigerant container 10 may be condensed, i.e. the refrigerant container 10 may be operated as a condenser. For this purpose further refrigerant that has been cooled to a low temperature by an external frigorific device may be supplied to the heat exchanger 24 through the first heat-exchanger line 26. As it flows through the heat exchanger 24 the further refrigerant evaporates, simultaneously releasing cooling energy to the gaseous refrigerant received in the receiving space 12 of the refrigerant container 10. The further refrigerant that has evaporated as it flows through the heat exchanger 24 is removed from the heat exchanger 24 and the refrigerant container 10 through the second heat-exchanger line 28 and fed to the external frigorific device for recooling before being conveyed in the circuit via the first heat-exchanger line 26 back into the heat exchanger 24. The refrigerant received in the receiving space 12 of the refrigerant container 10, on the other hand, is condensed as a result of the transfer of thermal energy to the further refrigerant flowing through the heat exchanger 24. The pressure in the receiving space 12 of the refrigerant container 10 consequently drops.

At the start of the condensing operation the valves 20, 22 disposed in the receiving-space lines 16, 18 remain closed in order to protect components of the cooling system that are situated downstream and/or upstream of the refrigerant container 10 from the high pressure in the receiving space 12 of the refrigerant container 10. If as a result of the condensing of a corresponding proportion of the refrigerant received in the receiving space 12 of the refrigerant container 10 the pressure in the receiving space 12 of the refrigerant container 10 has dropped to a desired low level, on the other hand, by opening one of the valves 20, 22 or both of the valves 20, 22 a fluid-conveying connection may be established between the receiving space 12 of the refrigerant container 10 and the cooling circuit of the cooling system.

During normal operation of the cooling system usually refrigerant in the form of wet steam is supplied through the first receiving-space line 16 to the refrigerant container 10. The refrigerant in the form of wet steam is condensed as a result of the transfer of thermal energy to the further refrigerant flowing through the heat exchanger 24 and may be removed through the second receiving-space line 18 in the liquid state from the sump of the receiving space 12 of the refrigerant container 10 into the cooling circuit of the cooling system. During normal operation of the cooling system there is usually a continuous circulation of further refrigerant through the heat exchanger 24.

In order to be able to maintain an existing temperature difference between an interior of the heat exchanger 24 and the receiving space 12 of the refrigerant container 10, by means of the control valve 34 disposed in the second heat-exchanger line 28 the pressure of the further refrigerant in the heat exchanger 24 is adjusted so that it is higher than a pressure of the refrigerant in the receiving space 12 of the refrigerant container 10. In this case, under the control of the valve 34 further refrigerant may be conveyed through the second line branch 30 of the second heat-exchanger line 28 into the receiving space 12 of the refrigerant container 10. The further refrigerant exiting from the second line branch 30 of the second heat-exchanger line 28 expands in the receiving space 12, which is under system pressure, of the refrigerant container 10 and therefore acquires more or less wet steam properties. In order to prevent damage to feed devices disposed in the cooling circuit of the cooling system, it is therefore meaningful for the further refrigerant to be condensed prior to its removal from the receiving space 12 of the refrigerant container 10.

Should an undesirable temperature rise occur in the refrigerant container 10, the refrigerant container 10 may be run cold. For this purpose the control valve 20 disposed in the first receiving-space line 16 is closed, thereby preventing the further feed of wet steam into the receiving space 12 of the refrigerant container 10. Operation of the heat exchanger 24 however continues, as does the removal of liquid refrigerant from the receiving space 12 of the refrigerant container 10 through the second receiving-space line 18.

If the refrigerant received in the receiving space 12 of the refrigerant container 10 has a lower temperature than the further refrigerant flowing through the heat exchanger 24, the refrigerant container 10 may be operated also as a cold reservoir and transfer cooling energy from the refrigerant received in the receiving space 12 of the refrigerant container 10 to the further refrigerant flowing through the heat exchanger 24. It is further conceivable for the refrigerant container 10 to be operated as a separator for the separation of gaseous and liquid refrigerant in that in a corresponding operating state of the heat exchanger 24 both the first receiving-space line 16 and the second receiving-space line 18 are used to remove refrigerant from the receiving space 12 of the refrigerant container 10.

Figure 2:
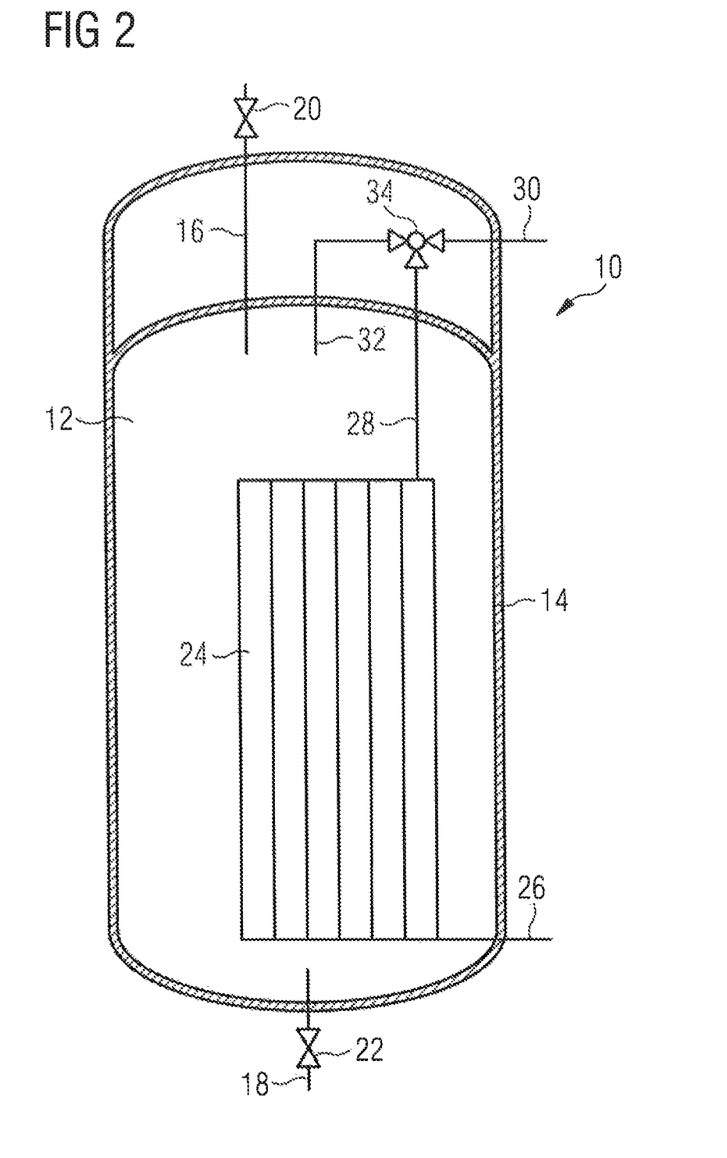

The further refrigerant container 10 that is represented in FIG. 2 differs from the arrangement according to FIG. 1 merely in that the control valve 34 disposed in the second heat-exchanger line 28 is disposed outside of the receiving space 12 in the interior of the refrigerant container 10. In this way electrical or electronic components of the valve 34 are protected from contact with the refrigerant received in the receiving space 12 of the refrigerant container 10. Otherwise the construction and the method of functioning of the refrigerant container 10 according to FIG. 2 correspond to the construction and the method of functioning of the arrangement represented in FIG. 1.

Figure 3:
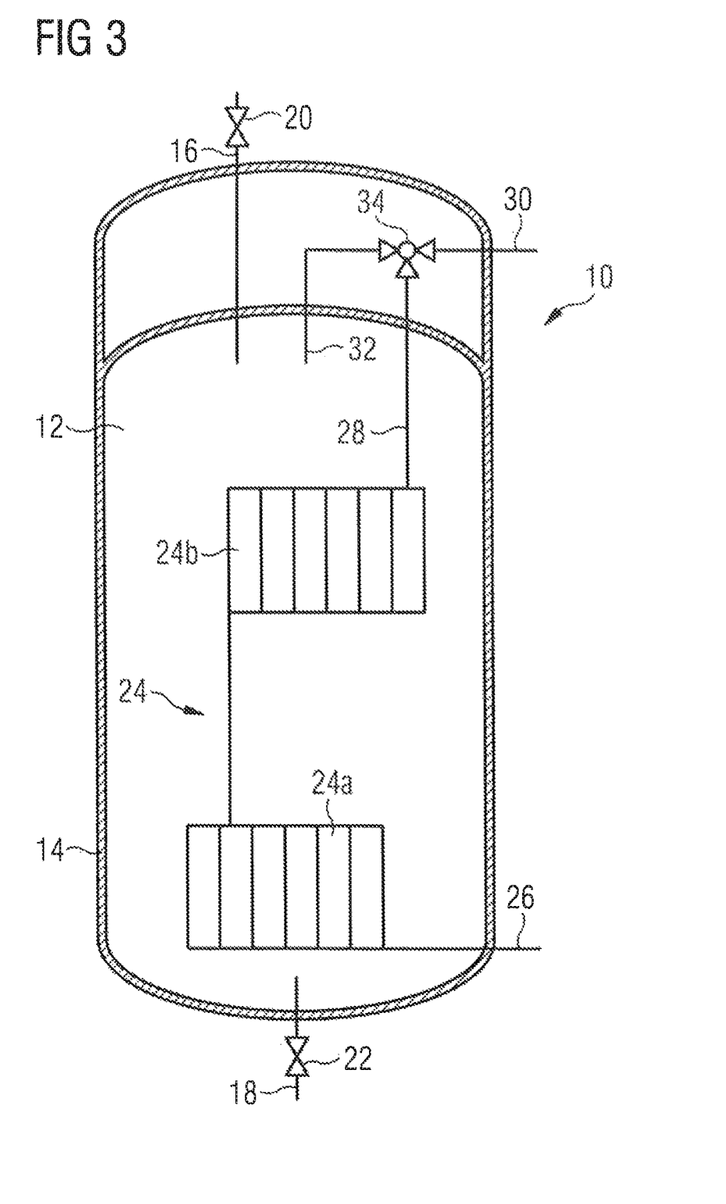

In the further refrigerant container 10 that is shown in FIG. 3, the heat exchanger 24 comprises a first portion 24a and a second portion 24b. The first portion 24a of the heat exchanger 24 is configured to remove heat from refrigerant in the liquid state of aggregation that is received in the sump of the receiving space 12. The second portion 24b of the heat exchanger 24 on the other hand is configured to remove heat from refrigerant in a gaseous state of aggregation that is received in a region of the receiving space 12 situated above the sump. A heat exchanger 24 having two portions 24a, 24b enables a differentiated heat transfer from refrigerant received in different regions of the receiving space 12 of the refrigerant container 10. Otherwise the construction and the method of functioning of the refrigerant container 10 according to FIG. 3 correspond to the construction and the method of functioning of the arrangement represented in FIG. 2.

Figure 4:
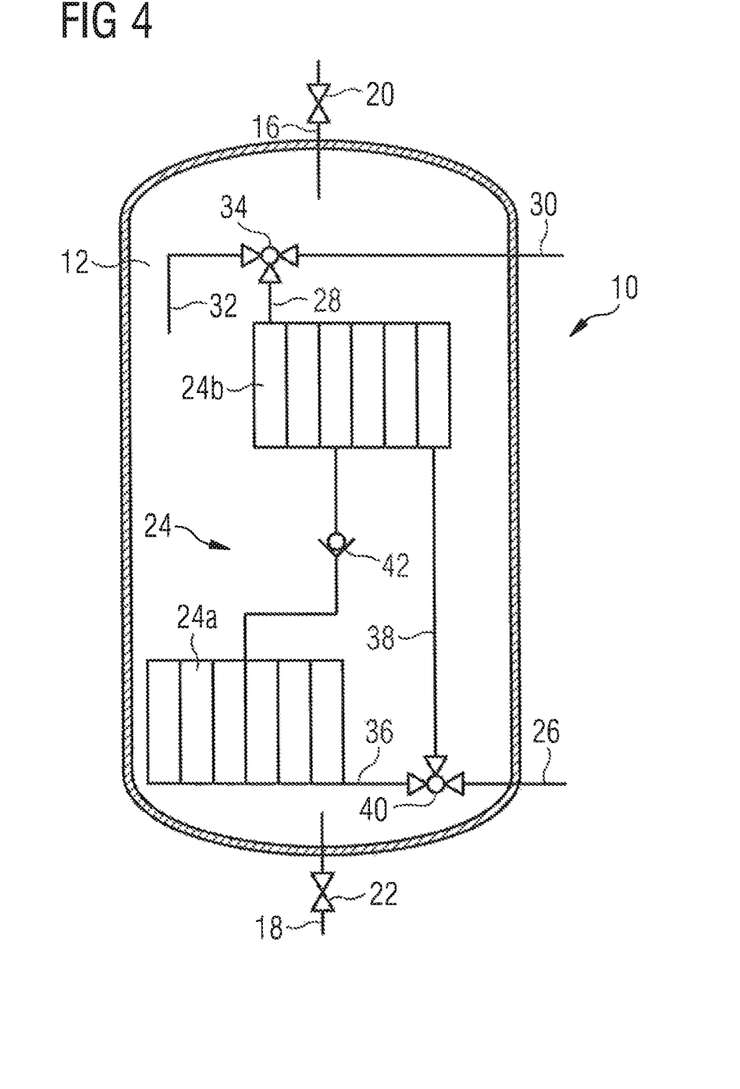

In the further refrigerant container 10 that is shown in FIG. 4, the first heat-exchanger line 26 for feeding the further refrigerant into the heat exchanger 24 comprises a first line branch 36, which is connected to the first portion 24a of the heat exchanger 24, and a second line branch 38, which is connected to the second portion 24b of the heat exchanger 24. Disposed in the first heat-exchanger line 26 at a connection point of the first and the second line branch 36, 38 is a control valve 40 for controlling the feed of the further refrigerant into the first and the second portion 24a, 24b of the heat exchanger 24. In this way the first and the second portion 24a, 24b of the heat exchanger 24 may be supplied in a differentiated manner with further refrigerant.

Disposed in a connection line that connects the portions 24a, 24b of the heat exchanger 24 is a non-return valve 42, which prevents a backflow of further refrigerant from the second portion 24b of the heat exchanger 24 into the first portion 24a of the heat exchanger. Otherwise the construction and the method of functioning of the refrigerant container 10 according to FIG. 4 correspond to the construction and the method of functioning of the arrangement represented in FIG. 3.

Figure 5:
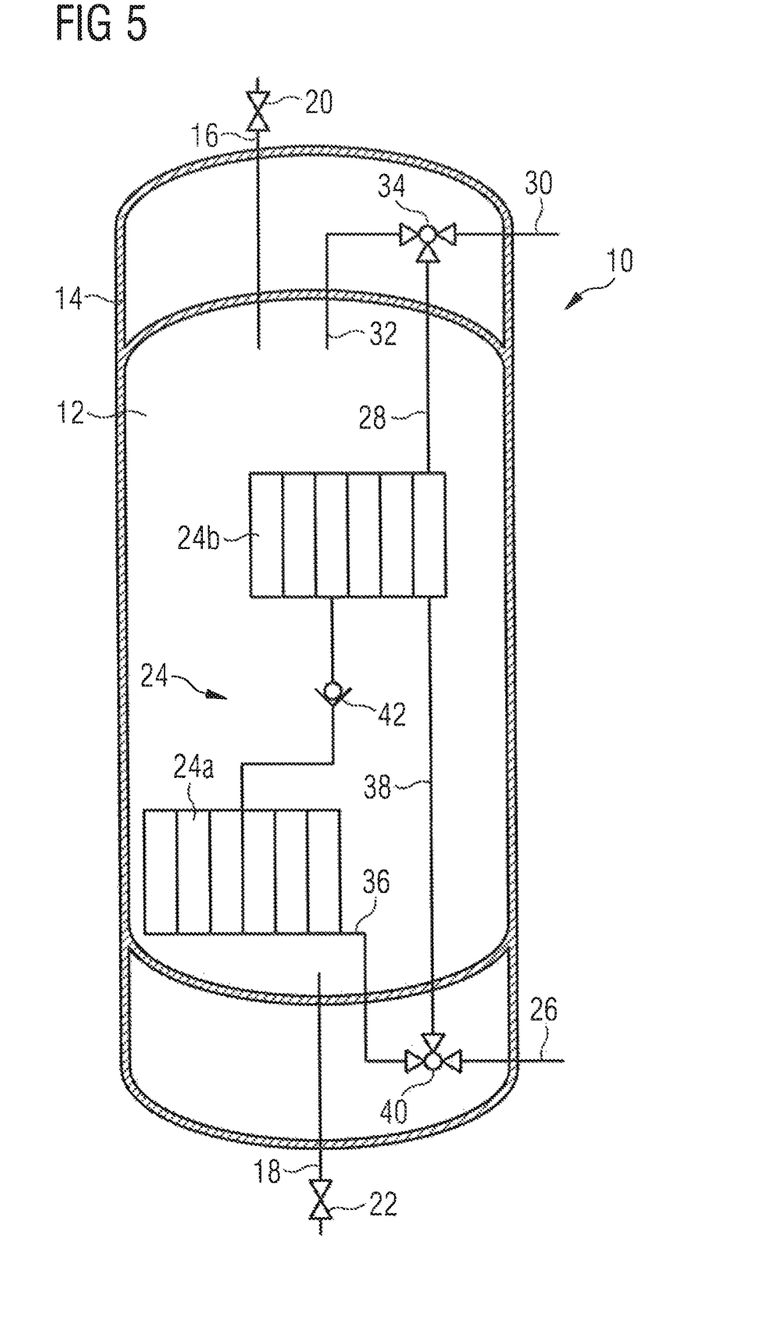

The further container 10 that is represented in FIG. 5 differs from the arrangement according to FIG. 4 merely in that the control valves 40, 34 disposed in the first heat-exchanger line 26 and the second heat-exchanger line 28 are disposed outside of the receiving space 12 in the interior of the refrigerant container 10. In this way electrical or electronic components of the valves 34, 40 are protected from contact with the refrigerant received in the receiving space 12 of the refrigerant container 10. Otherwise the construction and the method of functioning of the refrigerant container 10 according to FIG. 5 correspond to the construction and the method of functioning of the arrangement represented in FIG. 4.

Features that are described here in connection with individual embodiments of the refrigerant container may naturally also be realized in other embodiments of the refrigerant container. Features described in connection with specific embodiments of the refrigerant container may consequently be translated in any combination to other embodiments of the refrigerant container. Specifically all refrigerant containers may receive in their receiving space a heat exchanger having a first and a second portion as described in connection with FIGS. 3 to 5.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A refrigerant container arranged in a cooling system designed for operation with a first refrigerant and comprising a receiving space for receiving the first refrigerant that is disposed in an interior of the refrigerant container, comprising:
   a heat exchanger disposed in the receiving space of the refrigerant container, the heat exchanger allowing passage of a further refrigerant therethrough and being configured to remove heat from the first refrigerant in at least one of liquid and gaseous states of aggregation that is received in the receiving space in order to at least one of subcool the first refrigerant and convert the first refrigerant to the liquid state of aggregation,
   wherein the heat exchanger comprises a first portion and a second portion,
      the first portion of the heat exchanger being configured to remove heat from the first refrigerant in the liquid state of aggregation that is received in a sump of the receiving space, and
      the second portion of the heat exchanger being configured to remove heat from the first refrigerant in a gaseous state of aggregation that is received in a region of the receiving space situated above the sump,
   wherein the heat exchanger is connected to a first heat-exchanger line for feeding the further refrigerant into the heat exchanger and to a second heat-exchanger line,
   wherein the second heat-exchanger line branches into a first line branch, which leads out of the receiving space of the refrigerant container, and a second line branch, which opens into the receiving space of the refrigerant container.

2. The refrigerant container according to claim 1, wherein the receiving space of the refrigerant container is connected to a first receiving-space line for feeding the first refrigerant into the receiving space and to a second receiving-space line for removing the first refrigerant from the receiving space, wherein disposed in at least one of the first receiving-space line and the second receiving-space line is a control valve for controlling the flow of the first refrigerant through at least one of the first receiving-space line and the second receiving-space line.

3. The refrigerant container according to claim 1, wherein the second heat-exchanger line branches at a control valve for controlling the flow of the further refrigerant through at least one of the first and the second line branch of the second heat-exchanger line.

4. The refrigerant container according to claim 3, wherein the control valve disposed in the second heat-exchanger line is disposed outside of the receiving space in the interior of the refrigerant container.

5. The refrigerant container according claim 1, wherein the first heat-exchanger line for feeding the further refrigerant into the heat exchanger comprises a first line branch, which is connected to the first portion of the heat exchanger, and a second line branch, which is connected to the second portion of the heat exchanger, and that disposed in the first heat-exchanger line is at least one control valve for controlling the supply of the further refrigerant into at least one of the first and the second portion of the heat exchanger.

6. A method of operating a refrigerant container in a cooling system designed for operation with a first refrigerant and which comprises a receiving space for receiving the first refrigerant that is disposed in an interior of the refrigerant container, comprising the steps:
  flowing a further refrigerant from a first heat-exchanger line through a heat exchanger, which is disposed in the receiving space of the refrigerant container and which removes heat from the first refrigerant in a gaseous state of aggregation that is received in the receiving space in order to convert the first refrigerant to a liquid state of aggregation, and wherein the heat exchanger comprises a first portion and a second portion,
  removing heat with the first portion of the heat exchanger from the first refrigerant in the liquid state of aggregation that is received in a sump of the receiving space, and
  removing heat with the second portion of the heat exchanger from the first refrigerant in a gaseous state of aggregation that is received in a region of the receiving space situated above the sump, and
  flowing the further refrigerant to a second heat-exchanger line branching into a first line branch, which leads out of the receiving space of the refrigerant container, and a second line branch, which opens into the receiving space of the refrigerant container.

7. The method according to claim 6, wherein the receiving space of the refrigerant container is connected to a first receiving-space line for feeding the first refrigerant into the receiving space and to a second receiving-space line for removing the first refrigerant from the receiving space, and including the step of controlling the flow of the first refrigerant through at least one of the first receiving-space line and the second receiving-space line by means of a control valve disposed in at least one of the first receiving-space line and the second receiving-space line.

8. The method according to claim 6, including the step of controlling the flow of the further refrigerant through at least one of the first and the second line branch of the second heat-exchanger line via a control valve disposed in the second heat-exchanger line.

9. The method according to claim 8, including the step of disposing the control valve in the second heat-exchanger line outside of the receiving space in the interior of the refrigerant container.

10. The method according to claim 9, wherein the first heat-exchanger line for feeding the further refrigerant into the heat exchanger comprises a first line branch, which is connected to the first portion of the heat exchanger, and a second line branch, which is connected to the second portion of the heat exchanger, and including the step of controlling a supply of the further refrigerant into at least one of the first and the second portion of the heat exchanger via at least one control valve disposed in the first heat-exchanger line.

11. The method according to claim 6, including the step of providing the cooling system on board an aircraft.

12. The refrigerant container according to claim 1, wherein the cooling system is located on board an aircraft.

13. The refrigerant container according to claim 3, wherein the control valve is disposed inside of the receiving space of the refrigerant container.

14. The refrigerant container according to claim 3, wherein the control valve is disposed inside of an enclosure surrounding the receiving space of the refrigerant container.

15. The refrigerant container according to claim 8, wherein the control valve is disposed inside of the receiving space of the refrigerant container.

16. The refrigerant container according to claim 8, wherein the control valve is disposed inside of an enclosure surrounding the receiving space of the refrigerant container.

* * * * *